United States Patent [19]

Sakamoto

[11] Patent Number: 4,721,032
[45] Date of Patent: Jan. 26, 1988

[54] ARRANGEMENTS FOR FORMING AUTOMOBILE COWL STRUCTURES

[75] Inventor: Toshinori Sakamoto, Higashihiroshima, Japan

[73] Assignee: Mazda Motor Corporation, Japan

[21] Appl. No.: 891,947

[22] Filed: Aug. 1, 1986

[30] Foreign Application Priority Data

Aug. 5, 1985 [JP] Japan .............. 60-120688[U]

[51] Int. Cl.$^4$ ............................... B60H 1/28
[52] U.S. Cl. ............................ 98/2.16; 98/2.07
[58] Field of Search .......... 98/2.06, 2.16, 2.17, 98/2, 2.11, 2.07, 2.08, 2.09; 180/90; 296/64 A, 64 R, 64 D

[56] References Cited

U.S. PATENT DOCUMENTS

| 2,800,067 | 7/1957 | Belfry | 98/2.16 |
| 4,286,506 | 9/1981 | Yanagida | 98/2 |
| 4,470,341 | 9/1984 | Hirukawa et al. | 98/2 X |
| 4,494,790 | 1/1985 | Omura | 96/2.17 X |
| 4,522,114 | 6/1985 | Matsuno | 98/2.09 |
| 4,597,323 | 7/1986 | Mordau et al. | 98/2.11 |

FOREIGN PATENT DOCUMENTS

| 221709 | 12/1983 | Japan | 98/2.16 |
| 29509 | 2/1984 | Japan | 296/84 A |
| 59-53112 | 4/1984 | Japan | |

Primary Examiner—Henry C. Yuen
Assistant Examiner—Steven E. Warner
Attorney, Agent, or Firm—Gerald J. Ferguson, Jr.; Michael P. Hoffman; Michael J. Foycik, Jr.

[57] ABSTRACT

An arrangement for forming an automobile cowl structure comprises a windshield supporting frame with a closed cross section provided for supporting a lower end of a front windshield and composed of a cowl top member formed in the shape of a bank protruding upward and elongating along the front windshield in the direction of the width of an automobile body construction and a cowl cover panel provided with the cowl top member fixed thereon and having a prolongation thereof horizontally extending backward beyond a rear end portion of the cowl top member, and an upper dash panel having a rear end wall portion thereof connected to a rear end portion of the prolongation of the cowl cover panel at its upper end.

12 Claims, 4 Drawing Figures

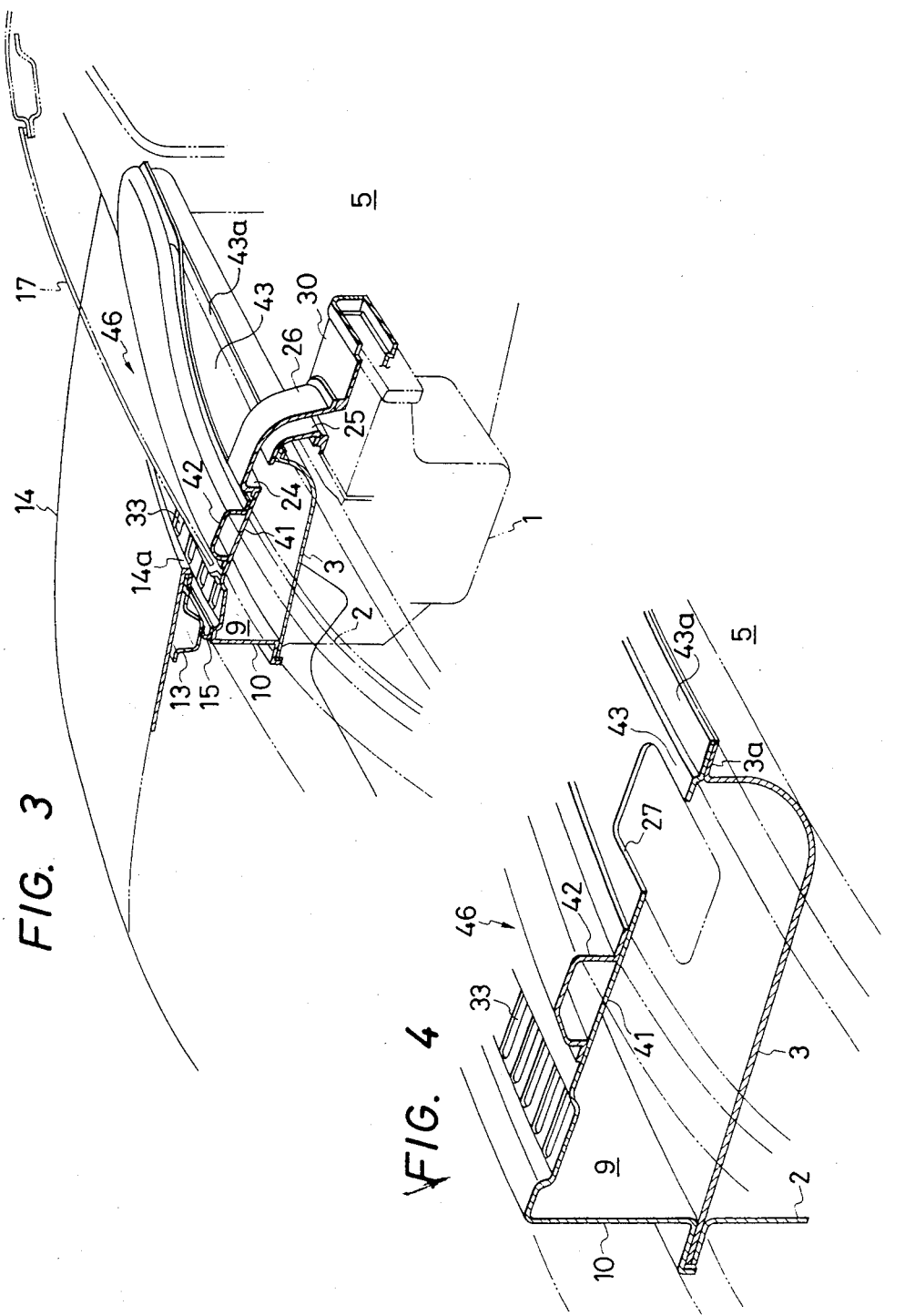

ARRANGEMENTS FOR FORMING AUTOMOBILE COWL STRUCTURES

BACKGROUND OF THE INVENTION

1. Field of the Invention

The present invention relates generally to arrangements for forming automobile cowl structures, and more particularly, to an arrangement for forming a cowl portion of an automobile body by which a sight point at the lower portion of a front windshield is set to be low so that the forward visibility for driving in an automobile is improved.

2. Description of the Prior Art

In an automobile body, a cowl structure located in front of a cabin space is usually provided with a ventilation device which is operative to introduce fresh air into a blowing duct opening to the cabin space for air conditioning. There has been proposed one of such ventilation devices which has a natural ventilation duct with its inlet end disposed at the rear portion of a cowl structure to take fresh air therein, as desclosed in the Japanese patent specification published before examination under the publication number: 59-53112.

FIG. 1 shows a part of an automobile body construction to which a previously proposed cowl structure accompanied with a ventilation device of the aforementioned type is adapted. In the automobile body construction shown in FIG. 1, an air conditioning unit 1 is contained in a space formed by a lower dash panel 2, an upper dash panel 3 and other members to supply warm air or cool air to a cabin space 5 through a ventilation duct 4. A natural ventilation duct 6 is mounted to pass through the rear wall portion of the upper dash panel 3 with its inlet end 7 opening into a space 9 in a cowl portion 8 for taking fresh air therein. The fresh air taken into the natural ventilation duct 6 through the inlet end 7 thereof is guided into the ventilation duct 4 to be mixed with the warm air or cool air supplied therethrough to the cabin space 5. The space 9 is formed with a front cowl panel 10, the upper dash panel 3, a cowl cover panel 11 and a cowl top member 12 both mounted on the upper dash panel 3 and so on. In addition, an engine bonnet 14 accompanied with a reinforcing member 13 is provided to face the front cowl panel 10 with a seal member 15 between for covering an engine and other equipments.

A windshield supporting frame 16 composed of the cowl cover panel 11 and the cowl top member 12 is shaped to extend along a front windshield 17 and the lower end of the front windshield 17 is attached through an adhesive 18 to a front surface 16a of the windshield supporting frame 16. Further, an instrument panel 19 is provided in the cabin space 5 to cover the windshield supporting frame 16, the rear wall portion of the upper dash panel 3, the natural ventilation duct 6 and the ventilation duct 4. A horizontally extending portion 19A of the instrument panel 19 is positioned to be at the same level as a rear end portion 14a of the engine bonnet 14.

In connection with such a previously proposed automobile body construction, it has been recently desired to lower a sight point 23 at the lower portion of the front windshield 17 in order to realize such a body shape as reduced in height and improved in forward visibility. However, in fact, since the windshield supporting frame 16 is disposed on the natural ventilation duct 6, the horizontally extending portion 19A of the instrument panel 19 is inevitably positioned at a relatively high level and therefore the rear end portion 14a of the engine bonnet 14 is also positioned at the relatively high level, so that the sight point 23 at the lower portion of the front windshield 17 is set to be relatively high.

For lowering the sight point 23, it is considered to reduce the height of the lower dash panel 2. However, it is quite difficult to make the lower dash panel 2 low because the air conditioning unit 1 is provided under the lower dash panel 2 and a transmission unit may be disposed further under the air conditioning unit 1. Besides, a floor in the cabin space 5 is connected to the lower dash panel 2 in such a manner that an appropriate space for legs of a driver is provided on the floor, and consequently the lower dash panel 2 must be relatively high in its height.

In addition to the above mentioned problem, there is a further disadvantage in the previously proposed automobile body construction as follows. The natural ventilation duct 6 is mounted to pass through the rear wall portion of the upper dash panel 3 as described above and therefore it is feared that the lower part of a mounting portion of the natural ventilation duct 6 engaging with the upper dash panel 3 is soaked in rainwater or washing water collected on the bottom of the cowl portion 8. Accordingly, a tight seal member 20 must be placed between the rear wall portion of the upper dash panel 3 and the mounting portion of the natural ventilation duct 6 in order to prevent water collected on the bottom of the cowl portion 8 from entering or penetrating into the cabin space 5 through the natural ventilation duct 6.

OBJECTS AND SUMMARY OF THE INVENTION

It is an object of the present invention to provid an arrangement for forming an automobile cowl structure which avoids the aforementioned problems encountered with the previously proposed automobile body construction.

Another object of the present invention is to provide an arrangement for forming an automobile cowl structure, in which the positional relation between a windshield supporting frame and a natural ventilation duct both disposed therein is improved to cause a sight point at the lower portion of a front windshield to be relatively low.

A further object of the present invention is to provide an arrangement for forming an automobile cowl structure, in which a seal member used for sealing a mounting portion where a natural ventilation duct is mounted can be made simple in configuration.

According to the present invention, there is provided an arrangement for forming an automobile cowl structure, which comprises a windshield supporting frame with a closed cross section provided for supporting a lower end portion of a front windshield and composed of a cowl top member which is formed in the shape of a bank protruding upward and elongating along the front windshield in the direction of the width of an automobile body construction and a cowl cover panel which is provided with the cowl top member fixed thereon and has a prolongation thereof horizontally extending backward beyond a rear end portion of the cowl top member, and an upper dash panel having a rear end wall portion thereof with its upper end to which a rear end portion of the prolongation of the cowl cover panel is connected.

In the arrangement thus constituted in accordance with the present invention, the windshield supporting frame which supports the lower end portion of the front windshield is composed of the cowl cover panel and the cowl top member fixed on the cowl cover panel. The cowl top member is formed in the shape of a hollow bank protruding upward and elongating along the front windshield so as to create a closed cross section together with the cowl cover panel. The cowl cover member is formed to have the prolongation horizontally extending backward beyond the rear end portion of the cowl top member and the rear end portion of the prolongation is connected with the upper cowl panel. The upper cowl panel has the rear wall portion and the upper end of this rear wall portion is connected to the rear end portion of the prolongation of the cowl cover panel.

In one embodiment of the invention, the prolongation of the cowl cover panel is provided with an opening to which an inlet end of a natural ventilation duct conducting to a cabin space is mounted to take fresh air in the natural ventilation duct through the opening.

With the arrangement according to the present invention, the cowl cover panel is formed to have the horizontally extending prolongation to which the inlet end of the natural ventilation duct can be mounted to take fresh air in the natural ventilation duct, and consequently the windshield supporting frame and the natural ventilation duct are to be disposed laterally in substance. This results in that a horizontally extending portion of an instrument panel covering both the windshield supporting frame and the natural ventilation duct and a rear end portion of an engine bonnet provided in the outside of the cabin space can be reduced in their height, respectively, and accordingly a sight point at the lower portion of the windshield is set to be low enough so that a preferabl body shape which is reduced in height and improved in forward visibility is actualized.

Further, with the embodiment of the invention, there is no fear that a mounting portion of the natural ventilation duct engaging with the cowl cover panel is soaked in rainwater or washing water collected on the bottom of the cowl structure, and therefore a seal member used for the mounting portion of the natural ventilation duct can be made simple in configuration.

The above, and other objects, features and advantages of the present invention will become apparent from the following detailed description which is to be read in conjunction with the accompanying drawings.

BRIEF DESCRIPTION OF THE DRAWINGS

FIGS. 3 and 4 are schematic partial perspective views showing portions of the arrangement shown in FIG. 2, respectively.

DESCRIPTION OF THE PREFERRED EMBODIMENT

Now, one embodiment of arrangement for forming an automobile cowl structure according to the present invention will be described in detail with reference to the accompanying drawings.

Figure 2:
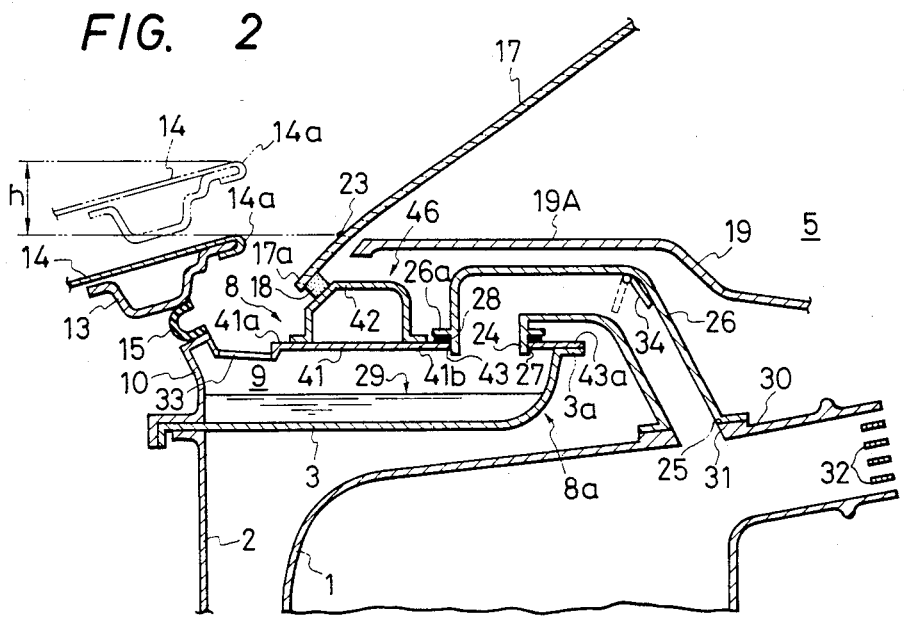
FIG. 2 is a schematic illustration showing a part of an automobile body construction to which an arrangement for forming an automobile cowl structure according to the present invention is adapted.

FIG. 2 shows a part of an automobile body construction to which an example of the arrangement according to the present invention is adapted. In the automobile body construction shown in FIG. 2, a windshield supporting frame 46 having a closed cross section is composed of a cowl cover panel 41 and a cowl top member 42 and disposed in front of a cabin space 5 to support a lower end 17a of a front windshield 17. In detail, the cowl cover panel 41 is mounted on an upper dash panel 3 to be positioned at the upper part of a cowl portion 8, and the cowl top member 42 which is formed in the shape of a hollow bank protruding upward and elongating along the front windshield 17 in the direction of the width of the body construction, as shown in FIG. 3, is fixed on the cowl cover panel 41 by means of, for example, welding, so as to create the closed cross section together with the cowl cover panel 41. In this example, the lower end 17a of the front windshield 17 is attached through an adhesive 18 to the front surface of the cowl top member 42, and the cowl cover panel 41 is formed in a body with a front cowl panel 10 which is disposed on the upper dash panel 3 for forming a front end part of the cowl portion 8.

The cowl cover panel 41 has a prolongation 43 which horizontally extends backward beyond a connecting portion 41b thereof at which the rear end portion of the cowl top member 42 is fixed to the cowl cover panel 41, and a rear end portion 43a of the prolongation 43 is connected with an upper end 3a of the rear end wall portion of the upper dash panel 3 which forms a rear end part 8a of the cowl portion 8. The cowl cover panel 41 and the front cowl panel 10 formed in a body with the cowl cover panel 41 are supported through the upper dash panel 3 by a lower dash panel 2 provided under the upper dash panel 3.

The prolongation 43 of the cowl cover panel 41 is provided with an opening 27, as shown clearly in FIG. 4, and a natural ventilation duct 26 is connected through the opening 27 to the prolongation 43 of the cowl cover panel 41. An inlet end 24 of the natural ventilation duct 26 is mounted on the prolongation 43 to engage with the opening 27 provided thereon and sealed with a seal member 28 which is put between a flange 26a projecting from the outer surface of the inlet end 24 and an annular portion of the prolongation 43 surrounding the opening 27. An outlet end 25 of the natural ventilation duct 26 is connected to a ventilation duct 30, which elongates from an air conditioning unit 1 and is opened to the cabin space 5, at an inlet opening 31 provided on the same.

In this example, a control valve 34 is provided in the natural ventilation duct 26 for opening or shutting an air passage formed by the natural ventilation duct 26, and a plurality of control plates 32 are provided at the outlet end of the ventilation duct 30 for controlling the direction of air flow supplied to the cabin space 5. In addition, as shown clearly in FIGS. 3 and 4, the cowl cover panel 41 is provided with a plurality of slits 33 at a portion 41a thereof located in front of the cowl top member 42, and fresh air is introduced through the slits 33 into a space 9 formed in the cowl portion 8 with the front cowl panel 10, the cowl cover panel 41 and the upper dash panel 3.

In the cabin space 5, an instrument panel 19 is provided to cover both the windshield supporting frame 46 and the natural ventilation duct 26. A flat portion 19A of the instrument panel 19 extendes horizontally over the windshield supporting frame 46 and the natural ventilation duct 26 to reach to the vicinity of the lower portion of the front windshield 17.

Further, an engine bonnet 14 accompanied with a reinforcing member 13 is provided to face the front cowl panel 10 with a seal member 15 between for covering an engine and other equipments. A rear end 14a of the engine bonnet 14 is set to be positioned at almost the same level as the flat portion 19A of the instrument panel 19 positioned over the windshield supporting frame 46 and the natural ventilation duct 26.

With the configuration as aforementioned, in the case where ventilation or temperature adjustment is required for the cabin space, the control valve 34 provided in the natural ventilation duct 26 is caused to be put at the position indicated with a solid line in FIG. 2 so as to open the air passage, and thereby fresh air which is introduced through the slits 33 into the space 9 is taken into the natural ventilation duct 26 through the inlet end 24 disposed at the opening 27 provided on the prolongation 43 and supplied from the natural ventilation duct 26 through the outlet end 25 disposed at the inlet opening 31 to the ventilation duct 30 so as to be mixed with warm air or cool air flowing from the air conditioning unit 1 through the ventilation duct 30 to the cabin space 5.

Figure 1:
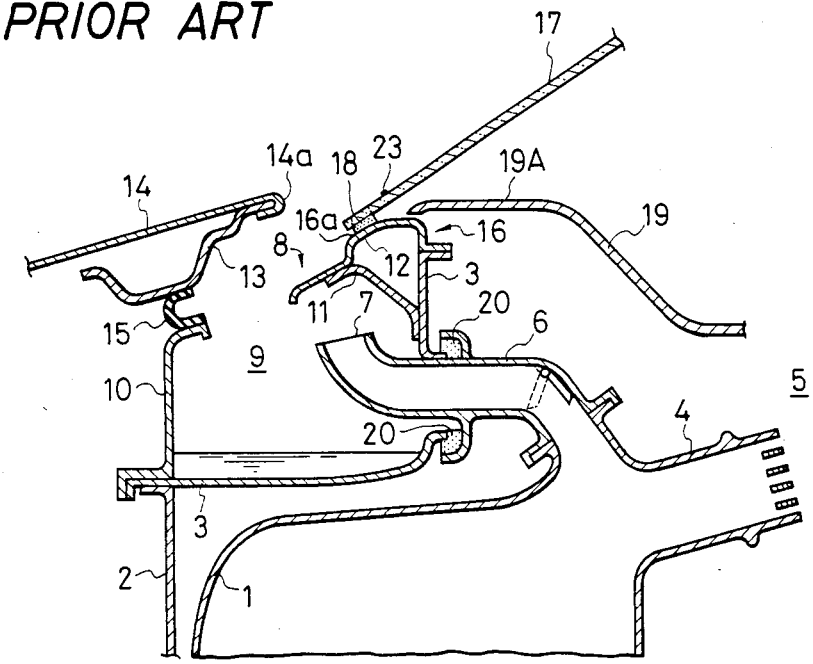
FIG. 1 is a schematic illustration showing a part of an automobile body construction to which a previously proposed cowl structure is adapted.

In the cowl construction formed in the cowl portion 8 as described above, the windshield supporting frame 46 supporting the lower end 17a of the front windshield 17, which is composed of the cowl cover panel 41 and the cowl top member 42, and the natural ventilation duct 26 mounted on the prolongation 43 of the cowl cover panel 41 are disposed laterally in substance so that the windshield supporting frame 46 is lowered in its position together with the flat portion 19A of the instrument panel 19 coverting both the windshield supporting frame 46 and the natural ventilation duct 26. As a result, the flat portion 19A of the instrument panel 19 and the rear end portion 14a of the engine bonnet 14 are reduced in their height, respectively, and accordingly a sight point 23 at the lower portion of the front windshield 17 is set to be low enough. For example, the position of the sight point 23 is lowered by a distance h as indicated in FIG. 2 in comparison with the prior art shown in FIG. 1.

Further, since the inlet end 24 of the natural ventilation duct 26 is positioned to be distant enough from the horizontally extending portion of the upper cowl panel 3, there is no fear that the inlet end 24 of the natural ventilation duct 26 is soaked in rainwater or washing water which may be collected on the horizontally expanding portion of the upper dash panel 3 as indicated with 29 in FIG. 2. Accordingly, the seal member 28 used for sealing the inlet end 24 of the natural ventilation duct 26 can be made simple in configuration.

What is claimed is:

1. An arrangement for forming an automobile cowl structure comprising:
    a windshield supporting frame with a closed cross section, for supporting a lower end of a front windshield and composed of (a) a cowl top member formed in the shape of a bank protruding upward and extending along the front windshield in the direction of the width of an automobile body construction and (b) a cowl cover panel having said cowl top member fixed thereon, said cowl cover panel having a prolongation incorporated therewith and horizontally extending backward beyond a rear end portion of said cowl top member, and
    an upper dash panel having a rear end wall portion thereof connected to the prolongation of said cowl cover panel at its upper end, said rear end wall portion being disposed to be distant in a backward direction relative to the closed cross section of said windshield supporting frame, so that a space formed between said cowl cover panel and the upper dash panel extends in a backward direction beyond the closed cross section of said windshield supporting frame.

2. An arrangement according to claim 1, wherein said prolongation of the cowl cover panel is provided with an opening to which an inlet end of a natural ventilation duct conducting to a cabin space in the automobile body construction is attached.

3. An arrangement according to claim 2, wherein said inlet end of the natural ventilation duct is mounted on said prolongation of the cowl cover panel to engage with said opening provided thereon and sealed with a seal member put between said inlet end and an annular portion of said prolongation surrounding said opening.

4. An arrangement according to claim 3, wherein said natural ventilation duct is provided therein with a control valve for opening or shutting an air passage formed in said natural ventilation duct.

5. An arrangement according to claim 2 further comprising a front cowl panel for forming a front end part of the automobile cowl structure, said front cowl panel being provided in a body with said cowl cover panel.

6. An arrangement according to claim 5, wherein said cowl cover panel is provided with a plurality of slits for causing fresh air to pass therethrough at a portion thereof located in front of said cowl top member.

7. An arrangement according to claim 5, wherein said inlet end of the natural ventilation duct is mounted on said prolongation of the cowl cover panel to engage with said opening provided thereon and sealed with a seal member put between said inlet end and an annular portion of said prolongation surrounding said opening.

8. An arrangement according to claim 7, wherein said natural ventilation duct is provided therein with a control valve for opening or shutting an air passage formed in said natural ventilation duct.

9. An arrangement according to claim 8, wherein said cowl cover panel is provided with a plurality of slits for causing fresh air to pass therethrough at a portion thereof located in front of said cowl top member.

10. An arrangement for forming an automobile cowl structure comprising;
    an upper wall portion substantially extending horizontally and provided thereon with a windshield supporting portion for supporting a lower end of a front windshield, said upper wall portion having a rear part thereof disposed below an instrument panel and provided at a position behind the windshield supporting portion thereon with an opening to which an inlet end of a natural ventilation duct conducting to a cabin space in an automobile body construction is attached,
    a front end wall portion extending downward from a front end of said upper wall portion,
    a rear end wall portion extending downward from a rear end of said upper wall portion, and
    a lower wall portion provided between said front and rear wall portions to face said upper wall portion so as to form, in cooperation with said upper wall portion and front and rear wall portions, a space having a closed cross section surrounded by said upper wall portion, front and rear wall portions and lower wall portion.

11. An arrangement according to claim 10, wherein said windshield supporting portion comprises a cowl top member extending along the front windshield in a direction of the width of the automobile body construction on said upper wall portion and formed in the shape of a bank protruding upward to form a closed cross section in cooperation with said upper wall portion.

12. An arrangement according to claim 11, wherein said upper wall portion is formed generally in the shape of a plane panel, so that said space formed to have the closed cross section surrounded by said upper wall portion, said front and rear wall portions and said lower wall portion is shaped to be relatively flat to extend horizontally, and said natural ventilation duct is disposed between said upper wall and said instrument panel.

* * * * *